(12) United States Patent
Zhang et al.

(10) Patent No.: US 8,326,661 B2
(45) Date of Patent: Dec. 4, 2012

(54) METHOD AND APPARATUS FOR PROVIDING DATA STATISTICS

(75) Inventors: Qing Zhang, Hangzhou (CN); Hai Wang, Hangzhou (CN); Yi Ding, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 665 days.

(21) Appl. No.: 12/456,806

(22) Filed: Jun. 22, 2009

(65) Prior Publication Data

US 2009/0327044 A1    Dec. 31, 2009

(30) Foreign Application Priority Data

Jun. 26, 2008   (CN) .......................... 2008 1 0126361

(51) Int. Cl.
*G06Q 40/00* (2012.01)
(52) U.S. Cl. ..................................... 705/7.11; 705/7.42
(58) Field of Classification Search .................... 705/10, 705/11, 7.11, 7.42
See application file for complete search history.

(56) References Cited

U.S. PATENT DOCUMENTS

| | | | |
|---|---|---|---|
| 5,915,243 A | 6/1999 | Smolen | |
| 5,956,693 A | 9/1999 | Geerlings | |
| 6,014,634 A | 1/2000 | Scroggie et al. | |
| 6,173,269 B1 | 1/2001 | Solokl et al. | |
| 6,233,565 B1 | 5/2001 | Lewis et al. | |
| 6,249,773 B1 | 6/2001 | Allard et al. | |
| 6,298,348 B1* | 10/2001 | Eldering | 705/36 R |
| 6,321,205 B1 | 11/2001 | Eder | |
| 6,965,868 B1 | 11/2005 | Bednarek | |
| 7,062,510 B1* | 6/2006 | Eldering | 1/1 |
| 7,103,565 B1* | 9/2006 | Vaid | 705/26.2 |
| 7,124,099 B2 | 10/2006 | Mesaros | |
| 7,162,432 B2* | 1/2007 | Mascarenhas | 705/7.32 |
| 7,240,025 B2 | 7/2007 | Stone et al. | |
| 8,010,400 B2* | 8/2011 | Mascarenhas | 705/7.29 |
| 8,126,850 B2* | 2/2012 | Yue et al. | 707/670 |
| 2002/0029162 A1* | 3/2002 | Mascarenhas | 705/10 |
| 2002/0161664 A1* | 10/2002 | Shaya et al. | 705/26 |
| 2005/0004880 A1 | 1/2005 | Musgrove et al. | |
| 2006/0010030 A1* | 1/2006 | Sorensen | 705/10 |
| 2007/0033084 A1* | 2/2007 | Mascarenhas | 705/7 |
| 2007/0156515 A1* | 7/2007 | Hasselback et al. | 705/14 |
| 2008/0027830 A1* | 1/2008 | Johnson et al. | 705/27 |
| 2009/0327044 A1* | 12/2009 | Zhang et al. | 705/10 |
| 2010/0042657 A1* | 2/2010 | Yue et al. | 707/200 |

* cited by examiner

*Primary Examiner* — Thomas Dixon
*Assistant Examiner* — Benjamin S Fields
(74) *Attorney, Agent, or Firm* — Van Pelt, Yi & James LLP

(57) ABSTRACT

Providing data statistics includes receiving property information of selected products input by users, searching and locating a Standard Property Union (SPU) corresponding to the property information in a database, the SPU comprising a set of one or more products sharing a set of one or more properties, generating behavior data, including by summarizing a cumulative number of behavioral instances associated with each product in the set of products included in the SPU, and outputting the behavior data.

13 Claims, 3 Drawing Sheets

METHOD AND APPARATUS FOR PROVIDING DATA STATISTICS

CROSS REFERENCE TO OTHER APPLICATIONS

This application claims priority to PRC Patent Application No. 200810126361.5 entitled METHOD AND DEVICE FOR DATA STATISTICS filed Jun. 26, 2008 which is incorporated herein by reference for all purposes.

BACKGROUND OF THE INVENTION

As online merchandise networks develop, more and more users are willing to make purchases online. During the purchasing process, the server on the network typically provides users with information of various kinds of products to satisfy the users' purchasing needs. Existing systems sometimes provide the users with product rankings by displaying products in a ranked list.

Given the massive amount of available data in large scale merchandise networks (in some instance data pertaining to billions of products), however, displaying a large number of products in a ranked list has become a problem. Users are often faced with an overwhelming number of products, many of which are of no interest to the user. The typical solutions used by systems today often neither satisfy the variety of user's needs nor enhance the purchasing experience for the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for providing data statistics is described. By realizing the real-time output of products ranking list according to selected product inputs by users, the technique satisfies the purchasing demands of different users, as well as enhances users purchasing experience.

Figure 1:
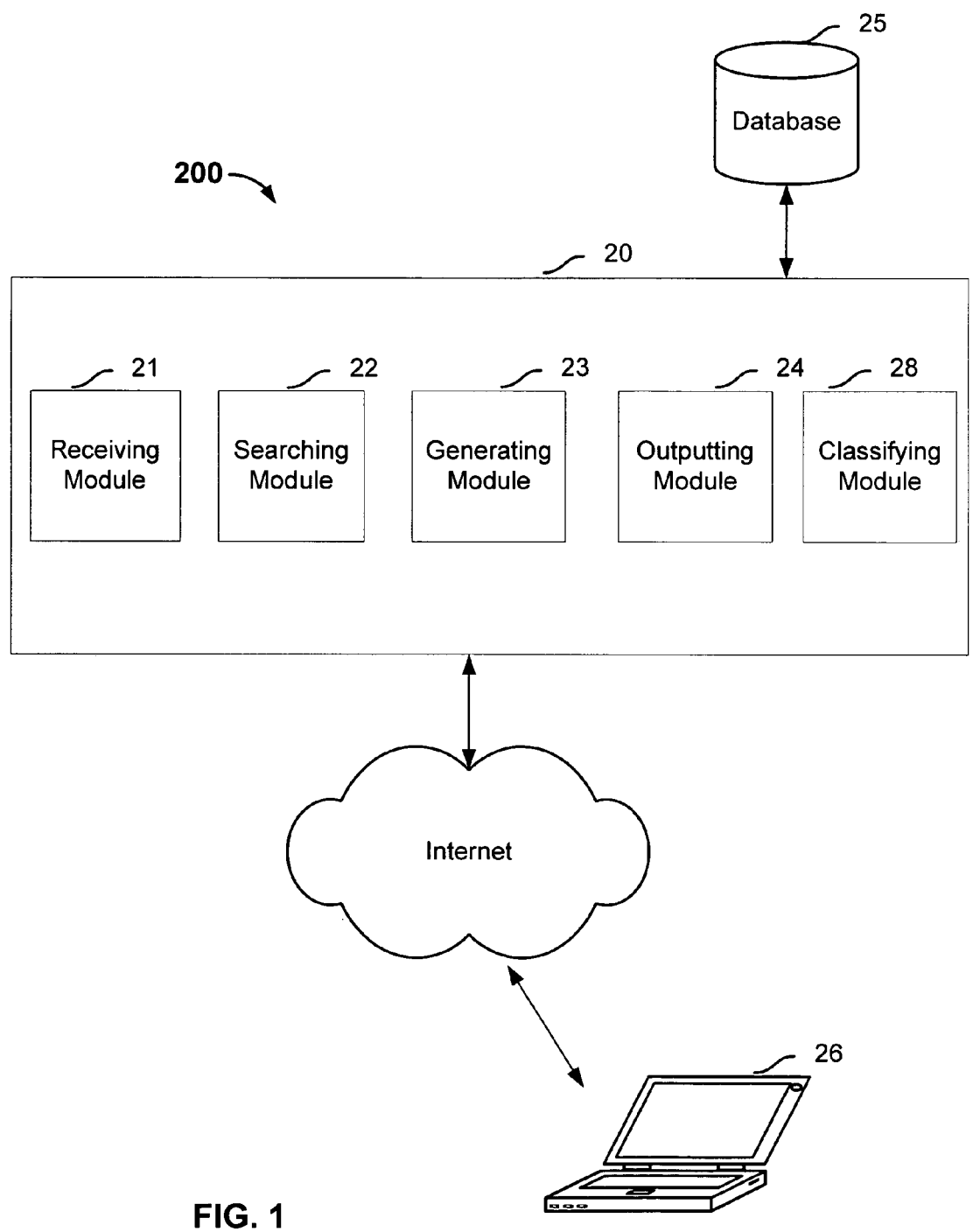
FIG. 1 is a block diagram illustrating an embodiment of a system that supports Standard Property Union (SPU) based statistical analysis.

FIG. 1 is a block diagram illustrating an embodiment of a merchant network that supports SPU based statistics. Network 200 includes a server system 20, which includes one or more servers, server clusters or any other appropriate devices capable of operating network/web based merchant services and communicating with client devices such as personal computers, hand-held devices, multi-processor systems, microprocessor-based or programmable consumer electronics, network PCs, minicomputers, and the like. Server system 20 is configured to communicate with client devices such as 26 via a network such as the Internet so that users of such client devices (e.g., buyers or sellers) can interact with the services operating on the server and conduct transactions.

In this example, server system 20 has access to a database 25, which may be separate from or integrated with the server. The database is populated with product information organized based on SPU information. In some embodiments, available products on network 200 are classified to various SPUs according to their respective properties and stored on the database. Examples of basic properties of a product include: price, picture of the product, transaction number, product origin, and capabilities of the selected products. As used herein, an SPU refers to an aggregation of a set of one or more products that share a set of one or more identical properties. In some embodiments, one SPU may be associated with several kinds of products (such as products from different sellers), and each product is associated with one corresponding SPU. For example, many sellers sell mobile phones on the merchant network. The producer, model and design of the phones vary widely. The phones may be classified according to one or more identical properties. For example, the server can label all model N73 camera phones by NOKIA with SPU1 (regardless of the sellers), all model N72 NOKIA camera phone with SPU2, and all model N76 NOKIA camera phone with SPU3.

Users such as 26 communicate with server system 20 via a network such as the Internet. In this example, server system 20 has a number of modules, including a receiving module 21 that is configured to receive property information of selected products input by users, a searching module 22 configured to search SPU corresponding to the property information received by the receiving module 21 in a database, a generating module 23 configured to generate basic behavior data (in some embodiments, a basic behavior data table is generated by summarizing cumulative number of behavioral instances according to the SPU located by the searching module 22), and an outputting module 24 to output the basic behavior data generated by the generating module 23. In some embodiments, the output is displayed to the user's browser software. The modules may be implemented using a variety of techniques, including as software comprising computer-executable instructions operating on one or more processors, as firmware comprising special instructions such as microcode operating on programmable logic devices, as hardware such as Application Specific Integrated Circuits (ASICs), or a combination thereof. For example, the receiving and outputting modules may be implemented as one or more communication interfaces including external connections, such as a port, cable, wireline or wireless network interface card, etc., and internal connections such as a communication bus.

Additional modules such as web services modules may also be included. In some embodiments, the server system further includes a classifying module 28 that is configured to classify numerous products, grouping ones that have one or more identical properties into a single SPU and save the SPU information in the database. In some embodiments, the database entry includes a corresponding identifier (SPU_ID) and the products classified as belonging to the SPU.

Figure 2:
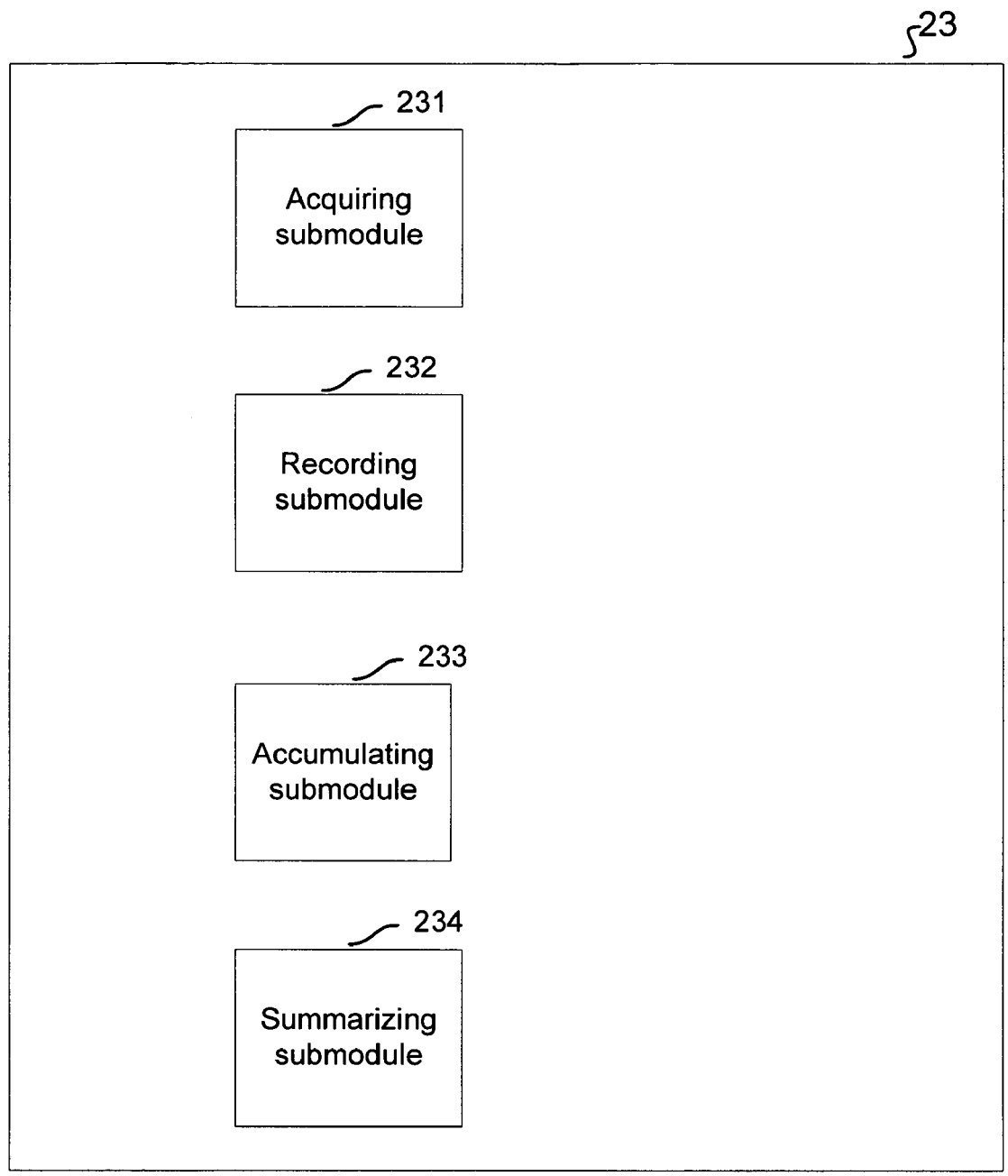
FIG. 2 is a block diagram illustrating an embodiment of a generating module.

FIG. 2 is a block diagram illustrating an embodiment of a generating module. Generating module 23 shown in this example may be included in a server system such as server system 20 of FIG. 1. In this example, the generating module includes an acquiring sub module 231 configured to acquire the behavioral data, a recording sub module 232 configured to record the behavioral data acquired by the acquiring sub module 231, an accumulating sub module 233 to accumulate the number of the behavioral data recorded by the recording sub module 232, and a summarizing sub module 234 to summarize the cumulative number of behavioral data accumulated by the accumulating sub module 233 according to the SPU. Like the modules shown in server system 20 of FIG. 1, the submodules can also be implemented as software/firmware/hardware or a combination thereof.

Figure 3:
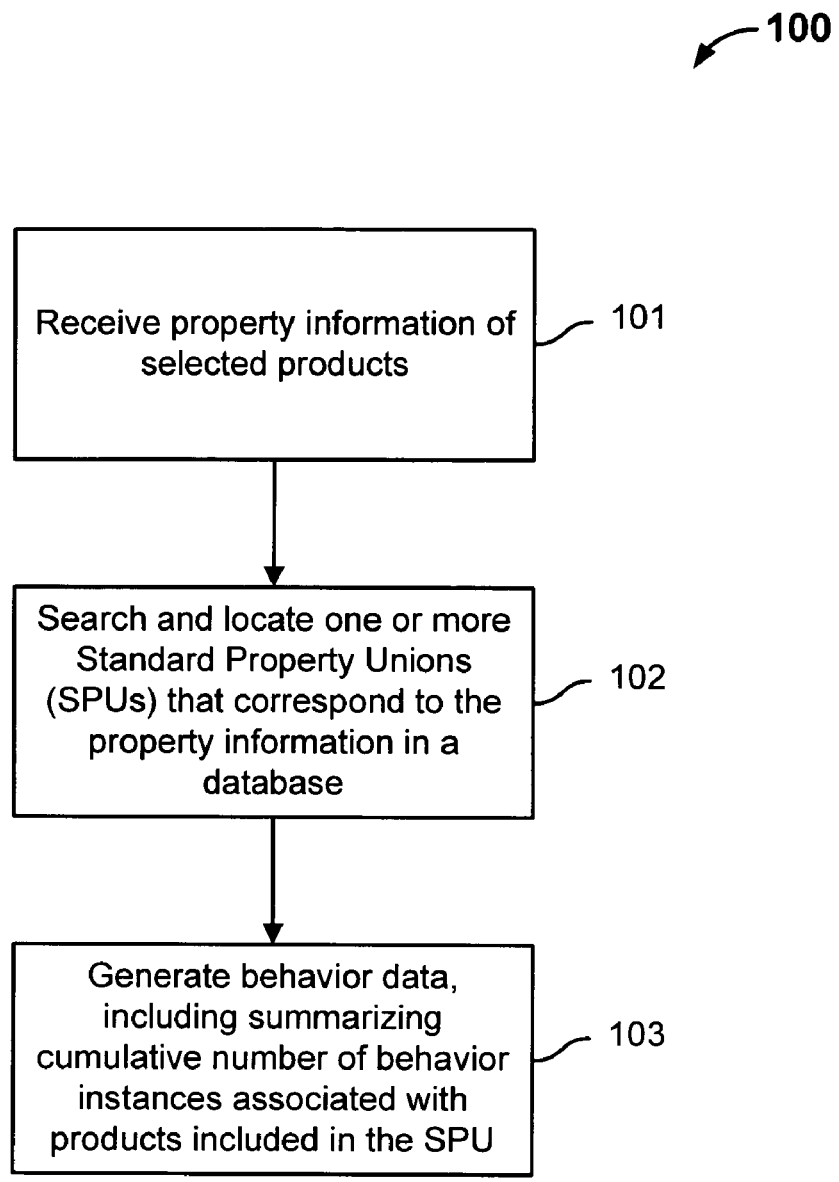
FIG. 3 is a flowchart illustrating an embodiment of a process for performing SPU based statistical analysis.

FIG. 3 shows a flow diagram of an embodiment of a process of generating data statistics. Process 100 process may be carried out on a server system such as server system 20 of FIG. 1.

At 101, property information of selected products is received. In some embodiments, the property information is input by users.

For example, a merchant's web page that is presented by the server to the client device operated by the user provides user interaction options. Using the webpage and the interaction options, the user may choose a product category and input basic property information of the selected products according to the user's personal preference. Examples of such basic property information of a selected product include: price, a picture of the product, transaction number, product origin, capabilities of the selected product, etc. For example, when a user is interested in buying a mobile phone with a built-in camera, the basic property information input by the user could include: with camera. In some embodiments, the user inputs the property information by selecting from a drop-down box listing a set of predefined options configured by the merchant. For example, in the mobile phone category, the options may include "with camera", "with touch screen", etc. In some embodiments, the user inputs the information directly by typing the text "with camera".

At 102, based on the property information pertaining to the selected product entered by the user, a database is queried to search for a SPU corresponding to the property information. As described previously in connection with FIG. 1, products offered for sale are classified according to their properties and grouped into SPUs, each of which includes a set of one or more products sharing a set of properties. For example, all mobile phones that share the same product origin, model number, and have built-in camera are grouped into one SPU.

In the example described above, where three different models of NOKIA camera phones are classified as three separate SPUs, when the user input the property information like "with camera, and NOKIA", three SPUs (SPU1, SPU2 and SPU3) that correspond to the input property information are located.

At 103, behavior data is generated. In some embodiments, the data is generated by summarizing the cumulative number of behavioral instances associated with products in the SPU. As used herein, behavioral instances refer to instances of certain types of user behavior with respect to a product, such as purchasing behavior (i.e., the user completes a purchase), saving behavior (i.e., the user saves a product to be accessed later), and viewing behavior (i.e., the user views a product).

In some embodiments, to collect behavior information, the server embeds a pixel point in each web page that invokes a script. When a user clicks the page, the embedded pixel point invokes a script that causes the network to send an access request to a log server. Upon receiving the access request, the log server acquires the ID, visiting time and Uniform Resource Locator (URL) of the user. The URL includes information that records the user's activities such as whether the user browsed, saved, and/or purchased certain products. The server can extract users' behavioral data by invoking the ID, visiting time and URL from the log server.

Over a period of time, the server accumulates the number of the behavioral data instances associated with products in an SPU. The server will record and accumulate all the behavioral data produced by various users for each product. In some embodiments, the server marks number of purchases associated with a product in an SPU as "L", where "L" is a nonnegative integer. When the user purchases the product, the server automatically increments the number of purchases "L" by 1. The server marks number of times the product is saved as "M", which is also a nonnegative integer. When the user saves the product, the server automatically increments number of saves "M" by 1. The server marks number of times a product is viewed as "N", which is also a nonnegative integer.

Over a period of time, after accumulating the number of the different behavioral data instances, the server labels the products with the SPU corresponding to the property of the products, and then accumulates the number of the different behavioral data classified by SPU.

In some embodiments, the server generates a basic behavior data table after summarizing the number of the different behavioral data classified by SPU. Referring to the example shown in table 1, the basic behavior data table includes: SPU_ID, corresponding property ID, category ID, purchasing number "L", collecting number "M", browsing number "N", etc.

TABLE 1

| | basic behavior data table | | | | |
|---|---|---|---|---|---|
| SPU_ID | corresponding property ID | category ID | number of purchases (L) | number of saves (M) | number of views (N) |

At 104, the server outputs the basic behavior data. In some embodiments, the basic behavior data is output as a basic behavior data table comprising a list according to a specific set of behavioral instances.

The server can output the basic behavior data table according to purchasing number, or collecting number, or browsing number, more specifically, in ascending order from the smallest number to the largest number. After receiving the basic behavior data table sent by the server, the client device displays a list of product information that satisfies users' given condition. In some embodiments, the product information includes: pictures and price of the products. Since behavior data is updated constantly in real-time, users can get real-time ranking list of products that satisfy given conditions specified by the users. Thus, users can make their purchase intention clear.

10, the number of times the product is saved by users "M" is 15, and the number of times the product is viewed by users "N" is 20. The statistical results of N76 NOKIA phone are shown as: the number of times the product is purchased by users "L" is 5, the number of times the product is saved by users "M" is 3, and the number of times the product is viewed by users "N" is 50. Referring to Table 2, the server system sends the basic behavior data table to a client device. The table is sorted according to purchasing number "L" in descending order. The client device shows the table to the user in a user interface such as a web browser.

TABLE 2

| basic behavior data table | | | | | | |
|---|---|---|---|---|---|---|
| SPU_ID | product | property corresponding ID | category ID | purchasing number L | collecting number M | browsing number N |
| 1 | N72 | camera, NOKIA | Mobile phone | 15 | 8 | 25 |
| 2 | N73 | camera, NOKIA | Mobile phone | 10 | 15 | 20 |
| 3 | N76 | camera, NOKIA | Mobile phone | 5 | 3 | 50 |

In one example, when visiting a web page displayed by the merchant website, the user chooses a product category. The chosen category will be shown as category ID in table 1. The user can input one or several property information according to personal preference. After receiving property information sent by the user, the database is searched for an SPU that corresponds to the property information. basic behavior data is generated by classifying cumulative number of behavioral data according to the SPU. After generating the basic behavior data, the server outputs the basic behavior data in a table. In the table, different SPU are listed according to a specific cumulative property number. In some embodiments, the values are sorted and shown in descending order or alternatively in ascending order. By tracking user behavior data in SPUs, the system can achieve the real-time output of products ranking list according to the preferred property information input by users, and satisfy purchasing needs of different users, as well as enhance users purchasing experience.

For example, faced with a prosperous market of numerous types of mobile phones, a user needs some guidance to make clear his/her purchase intention. When visiting a web page, the user can choose the mobile phone category, and input preferred property of the mobile phone. For example, if the user wishes to buy a NOKIA phone with camera, he/she can input "NOKIA" and "with camera" as the corresponding property ID. The server searches the database for SPUs that correspond to the input property information in the database. Assuming that the database is populated with SPU data as described in the example above in connection with Table 1, the search result would show that there are 3 SPUs that meet the required conditions, including SPU1, SPU2 and SPU3. SPU1 corresponds to N72 NOKIA phone. SPU2 corresponds to N73 NOKIA phone. SPU3 corresponds to N76 NOKIA phone. Over time, the numbers of the behavioral instances corresponding to SPU 1, SPU2 and SPU3 are accumulated, respectively, and the results are displayed. For example, the statistical results of N72 NOKIA phone are shown as: the number of times the product is purchased by users "L" is 15, the number of times the product is saved by users "M" is 8, and the number of times the product is viewed by users "N" is 25. The statistical results of N73 NOKIA phone are shown as: the number of times the product is purchased by users "L" is Thus, based on table 2, the user can easily find out that N72 NOKIA phone has the highest number of purchases made. This information can help the user further clarify his/her purchasing goals and make an appropriate purchase decision. Aggregating the voluminous product listings by SPU and then displaying each SPU's behavior data helps viewers in reviewing and understanding information related to the product listings.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a processor configured to:
        receive property information of selected products input by users;
        search and locate a Standard Property Union (SPU) corresponding to the property information in a database, the SPU comprising a set of one or more products sharing a set of one or more properties, wherein at least some of the set of one or more products in the SPU are associated with different product listings;
        generate behavior data, including by determining a cumulative number of one or more types of behavioral instances performed by a plurality of users with respect to each product in the set of products included in the SPU, wherein to generate behavior data includes:
            configuring corresponding relationships between the cumulative number of behavioral data and the SPU; and
            generating a basic behavior data table, in which correspondence between the cumulative number of behavioral data and the SPU is included;
        output the behavior data; and
    a memory coupled to the processor, configured to provide the processor with instructions.

2. The system of claim 1, wherein one type of behavioral instances includes a number of times the set of products have been purchased.

3. The system of claim 1, wherein one type of behavioral instances includes a number of times the set of products have been saved.

4. The system of claim 1, wherein one type of behavioral instances includes a number of times the set of products have been viewed.

5. The system of claim 1, wherein the database is populated by classifying a plurality of products and associating the plurality of products with different SPUs according to sets of identical properties corresponding to the products, and recording the correspondence between the sets of identical properties and the SPU in the database.

6. The system of claim 1, wherein the processor is further configured to acquire and record the behavioral instances.

7. A method comprising:
    receiving, using a processor, property information of selected products input by users;
    searching and locating a Standard Property Union (SPU) corresponding to the property information in a database, the SPU comprising a set of one or more products sharing a set of one or more properties, wherein at least some of the set of one or more products in the SPU are associated with different product listings;
    generating behavior data, including by determining a cumulative number of one or more types of behavioral instances performed by a plurality of users with respect to each product in the set of products included in the SPU, wherein generating behavior data includes:
        configuring corresponding relationships between the cumulative number of behavioral data and the SPU; and
        generating a basic behavior data table, in which correspondence between the cumulative number of behavioral data and the SPU is included; and
    outputting the behavior data.

8. The method of claim 7, wherein one type of behavioral instances includes a number of times the set of products have been purchased.

9. The method of claim 7, wherein one type of behavioral instances includes a number of times the set of products have been saved.

10. The method of claim 7, wherein one type of behavioral instances includes a number of times the set of products have been viewed.

11. The method of claim 7, wherein the database is populated by classifying a plurality of products and associating the plurality of products with different SPUs according to sets of identical properties corresponding to the products, and recording the correspondence between the sets of identical properties and the SPU in the database.

12. The method of claim 7, further comprising acquiring and recording the behavioral instances.

13. A computer program product, the computer program product being embodied in a non-transitory computer readable medium and comprising computer instructions for:
    receiving property information of selected products input by users;
    searching and locating a Standard Property Union (SPU) corresponding to the property information in a database, the SPU comprising a set of one or more products sharing a set of one or more properties, wherein at least some of the set of one or more products in the SPU are associated with different product listings; and generating behavior data, including by determining a cumulative number of one or more types of behavioral instances performed by a plurality of users with respect to each product in the set of products included in the SPU, wherein generating behavior data includes:

configuring corresponding relationships between the cumulative number of behavioral data and the SPU; and generating a basic behavior data table, in which correspondence between the cumulative number of behavioral data and the SPU is included; and outputting the behavior data.

* * * * *